(12) United States Patent
Hong

(10) Patent No.: US 12,252,914 B2
(45) Date of Patent: Mar. 18, 2025

(54) DEVICE WITH LOCK FUNCTION

(71) Applicant: Wistron Corporation, New Taipei (TW)

(72) Inventor: Wei-Zhe Hong, New Taipei (TW)

(73) Assignee: Wistron Corporation, New Taipei (TW)

( * ) Notice: Subject to any disclaimer, the term of this patent is extended or adjusted under 35 U.S.C. 154(b) by 229 days.

(21) Appl. No.: 17/839,454

(22) Filed: Jun. 13, 2022

(65) Prior Publication Data

US 2023/0304335 A1    Sep. 28, 2023

(30) Foreign Application Priority Data

Mar. 25, 2022    (TW) .................................. 111111280

(51) Int. Cl.
E05C 3/12 (2006.01)
G06F 1/18 (2006.01)

(52) U.S. Cl.
CPC ..................... E05C 3/12 (2013.01)

(58) Field of Classification Search
CPC ......... E05C 3/12; G06F 1/181; H05K 5/0208; H05K 5/0217
USPC ....................... 312/223.2; 361/724
See application file for complete search history.

(56) References Cited

U.S. PATENT DOCUMENTS

| | | | | |
|---|---|---|---|---|
| 7,443,666 B2 * | 10/2008 | Huang | .................... | G06F 1/185 312/223.1 |
| 7,471,507 B2 * | 12/2008 | Huang | .................... | G06F 1/186 361/679.55 |
| 7,602,605 B2 * | 10/2009 | Su | ........................ | E05B 65/0067 235/475 |
| 8,297,088 B1 * | 10/2012 | Zhang | .................... | G06F 1/182 70/164 |
| 8,437,132 B2 * | 5/2013 | Lin | ........................ | G06F 1/181 361/679.6 |
| 2006/0209501 A1 * | 9/2006 | Han | ........................ | G06F 1/181 361/679.55 |
| 2007/0001560 A1 * | 1/2007 | Chen | ........................ | G06F 1/181 312/223.2 |
| 2007/0151313 A1 * | 7/2007 | Fan | ........................ | E05B 65/006 70/101 |
| 2008/0225475 A1 * | 9/2008 | Zhang | .................... | G06F 1/181 361/726 |
| 2011/0279972 A1 * | 11/2011 | Xue | ........................ | G06F 1/181 361/679.57 |
| 2018/0164858 A1 * | 6/2018 | Lee | ........................ | H05K 5/03 |

FOREIGN PATENT DOCUMENTS

CN    102242585 A    11/2011

* cited by examiner

Primary Examiner — James O Hansen
(74) Attorney, Agent, or Firm — Winston Hsu

(57) ABSTRACT

A device with lock function includes a casing, a lock member, a cover and a shielding member. The lock member is rotatably disposed in the casing. The lock member includes a first engaging portion. The cover is disposed on the casing. The cover includes a second engaging portion. The shielding member drives the lock member to engage the first engaging portion with the second engaging portion to lock the cover.

4 Claims, 12 Drawing Sheets

DEVICE WITH LOCK FUNCTION

BACKGROUND OF THE INVENTION

1. Field of the Invention

The invention relates to a device with lock function and, more particularly, to a device capable of locking a cover by assembling a shielding member.

2. Description of the Prior Art

As technology advances and develops, various electronic devices (e.g. computer, server, etc.) are considered a necessity by a lot of people in their daily lives. The electronic devices are equipped with a lot of electronic components to provide various functions. Some electronic devices are equipped with a detachable side cover or top cover to facilitate the replacement or maintenance of electronic components. Furthermore, some electronic devices may be further assembled with a security shielding plate on the front to protect a region in front of the electronic devices. However, after the security shielding plate is assembled, the side cover or top cover can still be detached, such that the electronic components within the electronic device may be stolen or damaged.

SUMMARY OF THE INVENTION

The invention provides a device with lock function, so as to solve the aforesaid problems.

According to an embodiment of the invention, a device with lock function comprises a casing, a lock member, a cover and a shielding member. The lock member is rotatably disposed in the casing. The lock member comprises a first engaging portion. The cover is disposed on the casing. The cover comprises a second engaging portion. The shielding member drives the lock member to engage the first engaging portion with the second engaging portion to lock the cover.

As mentioned in the above, the invention disposes the rotatable lock member in the casing. A user may dispose the cover on the casing first and then assemble the shielding member to the casing. When the shielding member is assembled to the casing, the shielding member drives the lock member to rotate, such that the first engaging portion of the lock member engages with the second engaging portion of the cover to lock the cover. Accordingly, the invention can lock the cover by assembling the shielding member, so as to prevent the cover from being detached.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
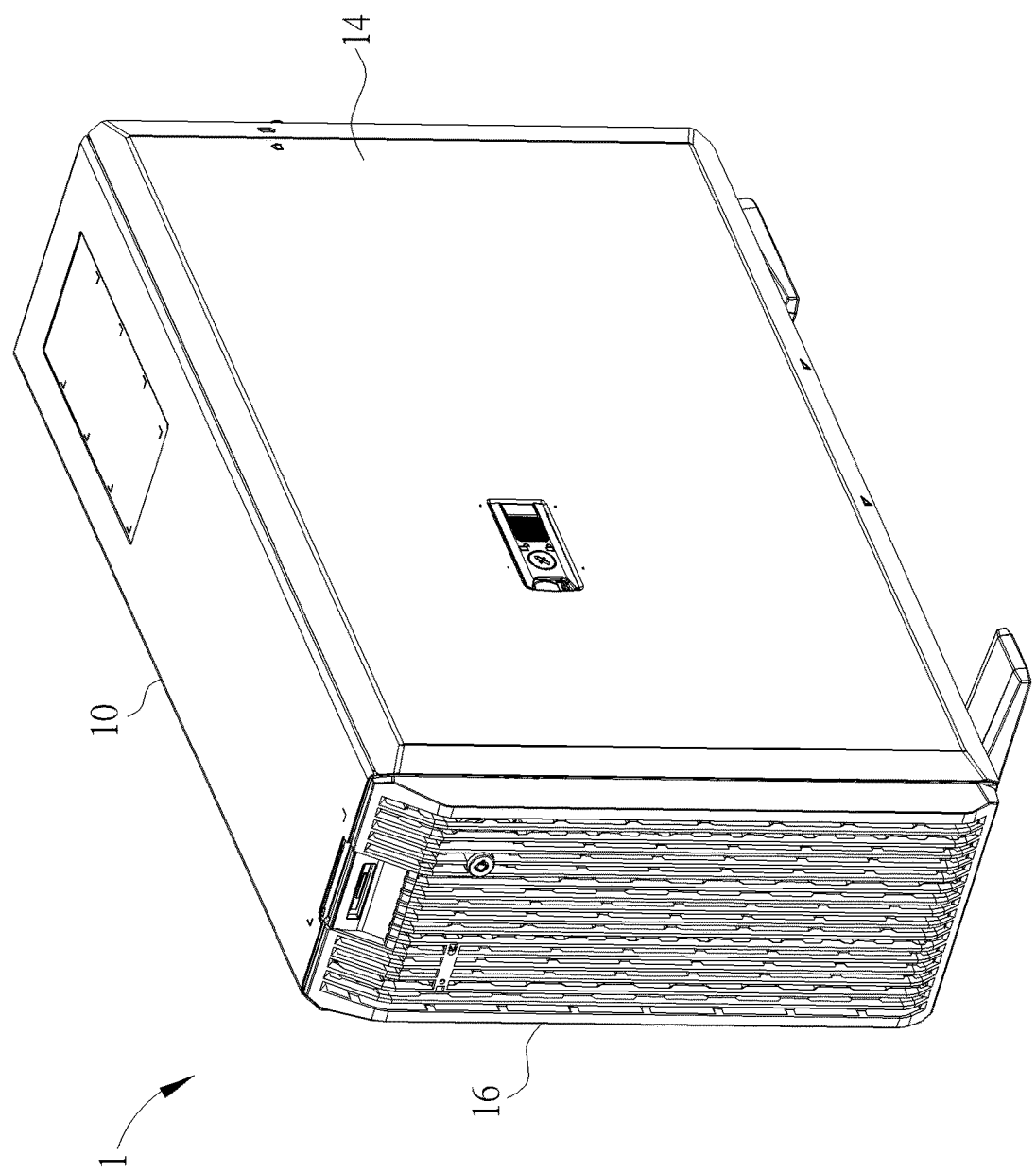
FIG. 1 is a perspective view illustrating a device with lock function according to an embodiment of the invention.
Figure 2:
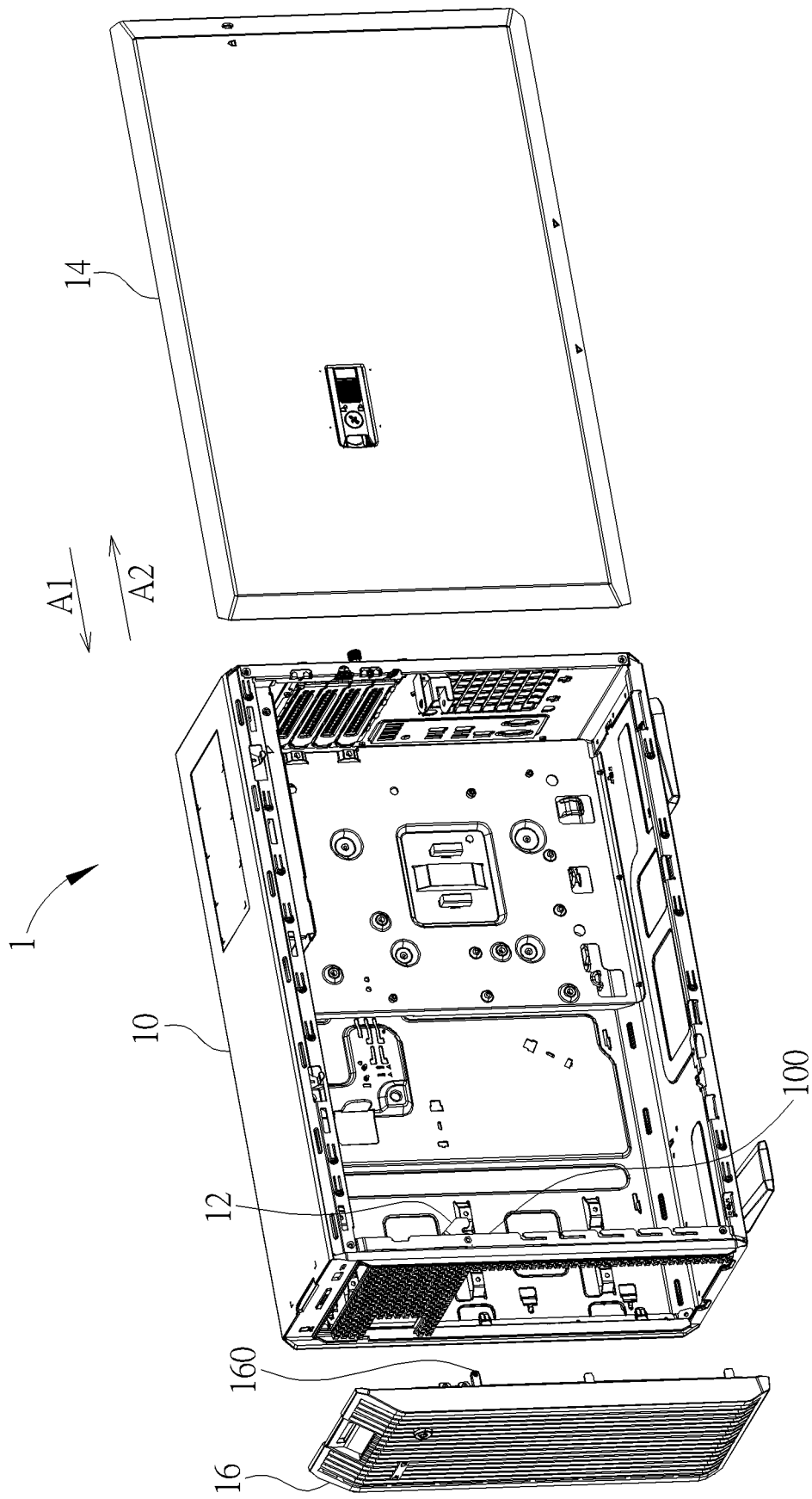
FIG. 2 is an exploded view illustrating the device shown in FIG. 1.
Figure 3:
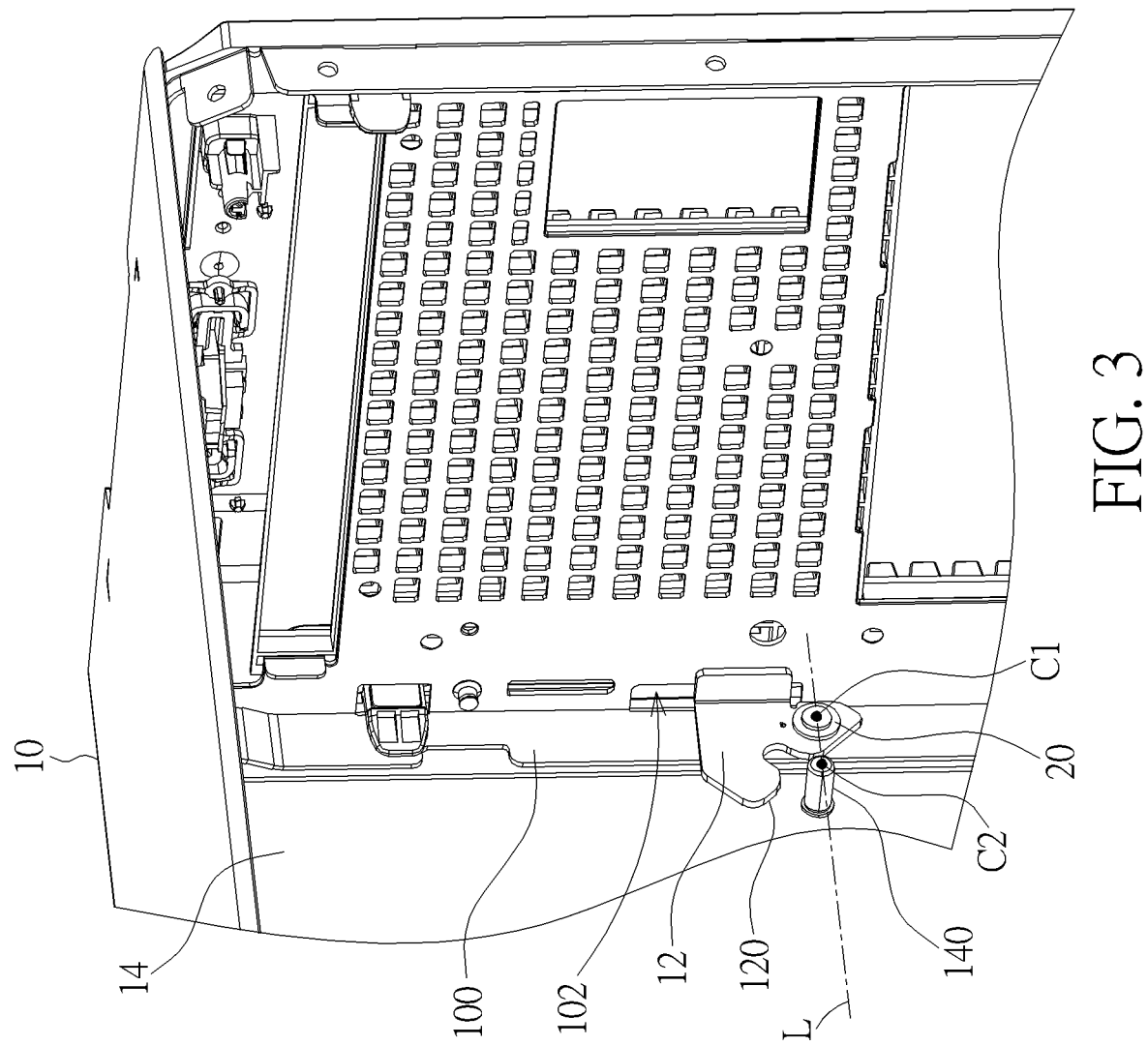
FIG. 3 is a partial inside view illustrating a casing shown in FIG. 2 from another viewing angle.
Figure 4:
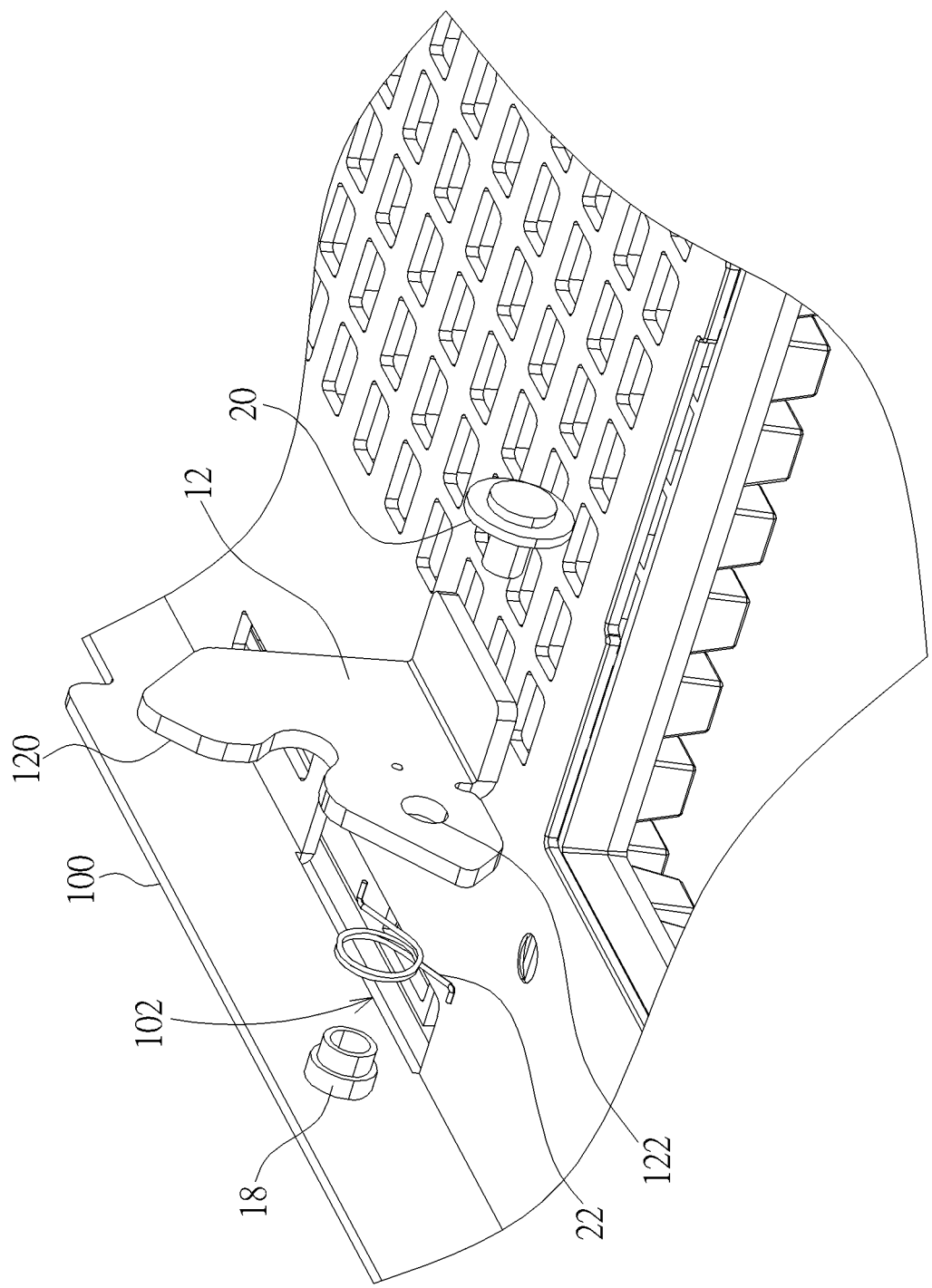
FIG. 4 is an exploded view illustrating a lock member and a bracket shown in FIG. 3.
Figure 5:
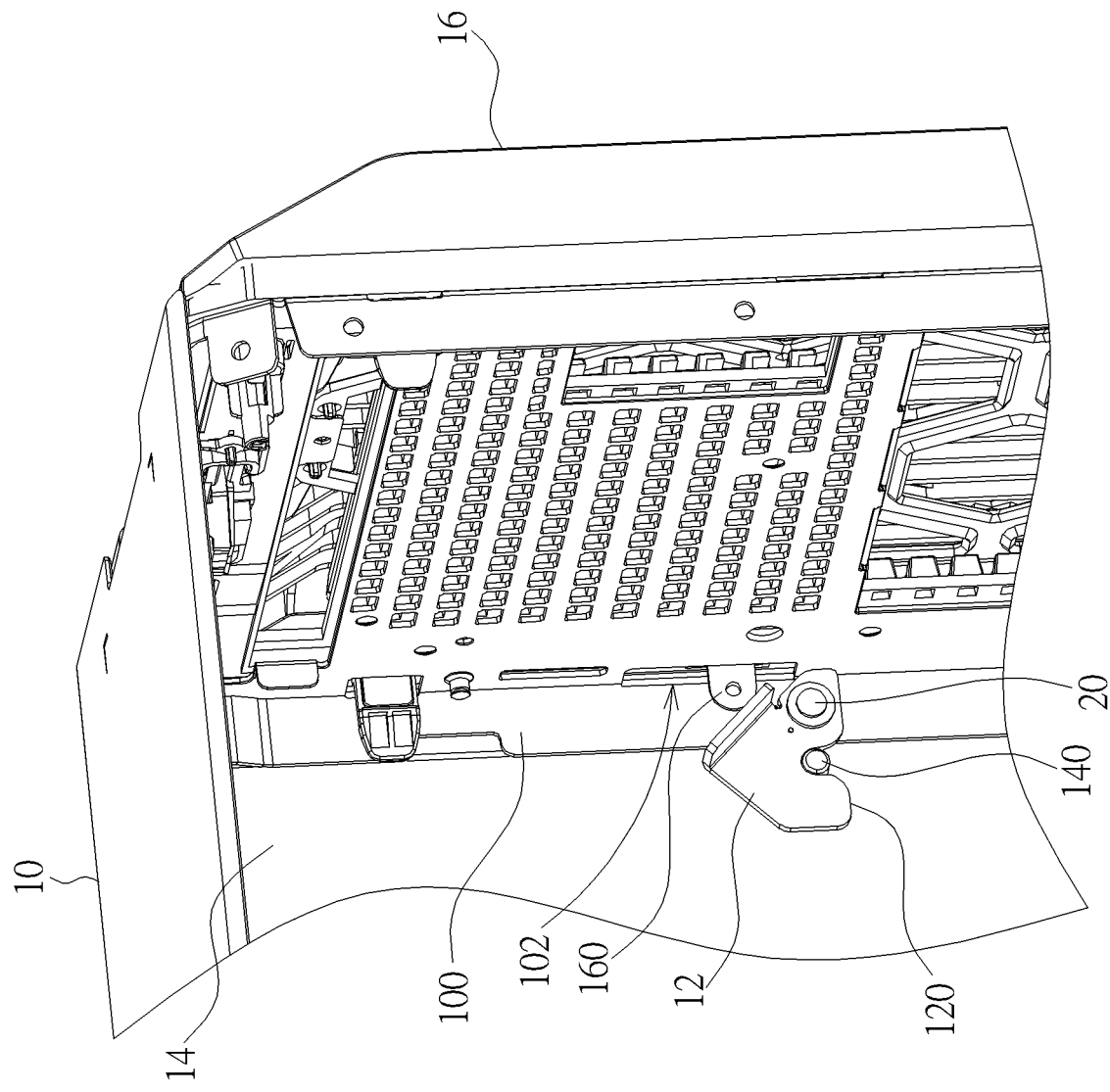
FIG. 5 is a perspective view illustrating the lock member shown in FIG. 3 locking a cover.

Referring to FIGS. 1 to 5, FIG. 1 is a perspective view illustrating a device 1 with lock function according to an embodiment of the invention, FIG. 2 is an exploded view illustrating the device 1 shown in FIG. 1, FIG. 3 is a partial inside view illustrating a casing 10 shown in FIG. 2 from another viewing angle, FIG. 4 is an exploded view illustrating a lock member 12 and a bracket 100 shown in FIG. 3, and FIG. 5 is a perspective view illustrating the lock member 12 shown in FIG. 3 locking a cover 14.

As shown in FIGS. 1 to 5, the device 1 with lock function comprises a casing 10, a lock member 12, a cover 14 and a shielding member 16. In this embodiment, the device 1 may be a computer, a server or other devices requiring lock function. It should be noted that the device 1 may be an electronic device or a non-electronic device according to practical applications.

The lock member 12 is rotatably disposed in the casing 10 and the lock member 12 comprises a first engaging portion 120. In this embodiment, the casing 10 may comprise a bracket 100 and the lock member 12 may be pivotally connected to the bracket 100 to be rotatably disposed in the casing 10. The bracket 100 may be, but is not limited to, a front bezel of the casing 10. In this embodiment, the device 1 may further comprise a standoff 18, a screw 20 and a torsion spring 22. As shown in FIG. 4, the standoff 18 may be embedded on the bracket 100. Furthermore, the lock member 12 may comprise a through hole 122. The screw 20 may pass through the through hole 122 to be fixed to the standoff 18 to pivotally connect the lock member 12 to the bracket 100. The torsion spring 22 may be sleeved on the standoff 18 and opposite ends of the torsion spring 22 are respectively connected to the lock member 12 and the bracket 100. Accordingly, after the lock member 12 rotates, the torsion spring 22 is able to drive the lock member 12 to return. It should be noted that the invention may also pivotally connect the lock member 12 to the bracket 100 by other shaft structures, wherein the composition of the shaft structure may be determined according to practical applications.

The cover 14 is disposed on the casing 10. The cover 14 may be, but is not limited to, a side cover of the casing 10. As shown in FIG. 2, the cover 14 may be assembled to one side of the casing 10 in a direction of an arrow A1 or be detached from the casing 10 in a direction of an arrow A2. As shown in FIGS. 3 and 5, the cover 14 comprises a second engaging portion 140.

A user may dispose the cover 14 on the casing 10 in the direction of the arrow A1 first. Then, the user assembles the shielding member 16 to the casing 10 in the direction of the arrow A2. When the shielding member 16 is assembled to the casing 10, the shielding member 16 drives the lock member 12 to rotate, such that the first engaging portion 120 of the lock member 12 engages with the second engaging portion 140 of the cover 14 to lock the cover 14. Accordingly, the invention can lock the cover 14 by assembling the shielding member 16, so as to prevent the cover 14 from being detached. The shielding member 16 may be, but is not limited to, a security shielding plate for protecting a region in front of the device 1.

In this embodiment, the bracket 100 may comprise an opening 102 (as shown in FIG. 5) and the shielding member 16 may comprise a protruding portion 160 (as shown in FIGS. 2 and 5). When the shielding member 16 is assembled to the casing 10, the protruding portion 160 of the shielding member 16 passes through the opening 102 of the bracket 100 to push the lock member 12 to rotate, such that the first engaging portion 120 of the lock member 12 engages with the second engaging portion 140 of the cover 14 to lock the cover 14. When the user wants to detach the cover 14, the user needs to detach the shielding member 16 first. After the shielding member 16 is detached, the torsion spring 22 drives the lock member 12 to return to a position shown in FIG. 3, such that the first engaging portion 120 of the lock member 12 disengages from the second engaging portion 140 of the cover 14. Then, the user can detach the cover 14 from the casing 10 in the direction of the arrow A2.

In this embodiment, a line L between a rotation center C1 of the lock member 12 and an axial center C2 of the second engaging portion 140 of the cover 14 is parallel to an assembly direction of the cover 14 relative to the casing 10 (i.e. the directions of the arrows A1, A2 shown in FIG. 2). In other words, the rotation center C1 of the lock member 12 and the axial center C2 of the second engaging portion 140 of the cover 14 may be located on the same horizontal line. Accordingly, the engagement between the first engaging portion 120 of the lock member 12 and the second engaging portion 140 of the cover 14 can withstand a large lateral force, such that the first engaging portion 120 of the lock member 12 will not come off the second engaging portion 140 of the cover 14 easily.

Figure 6:
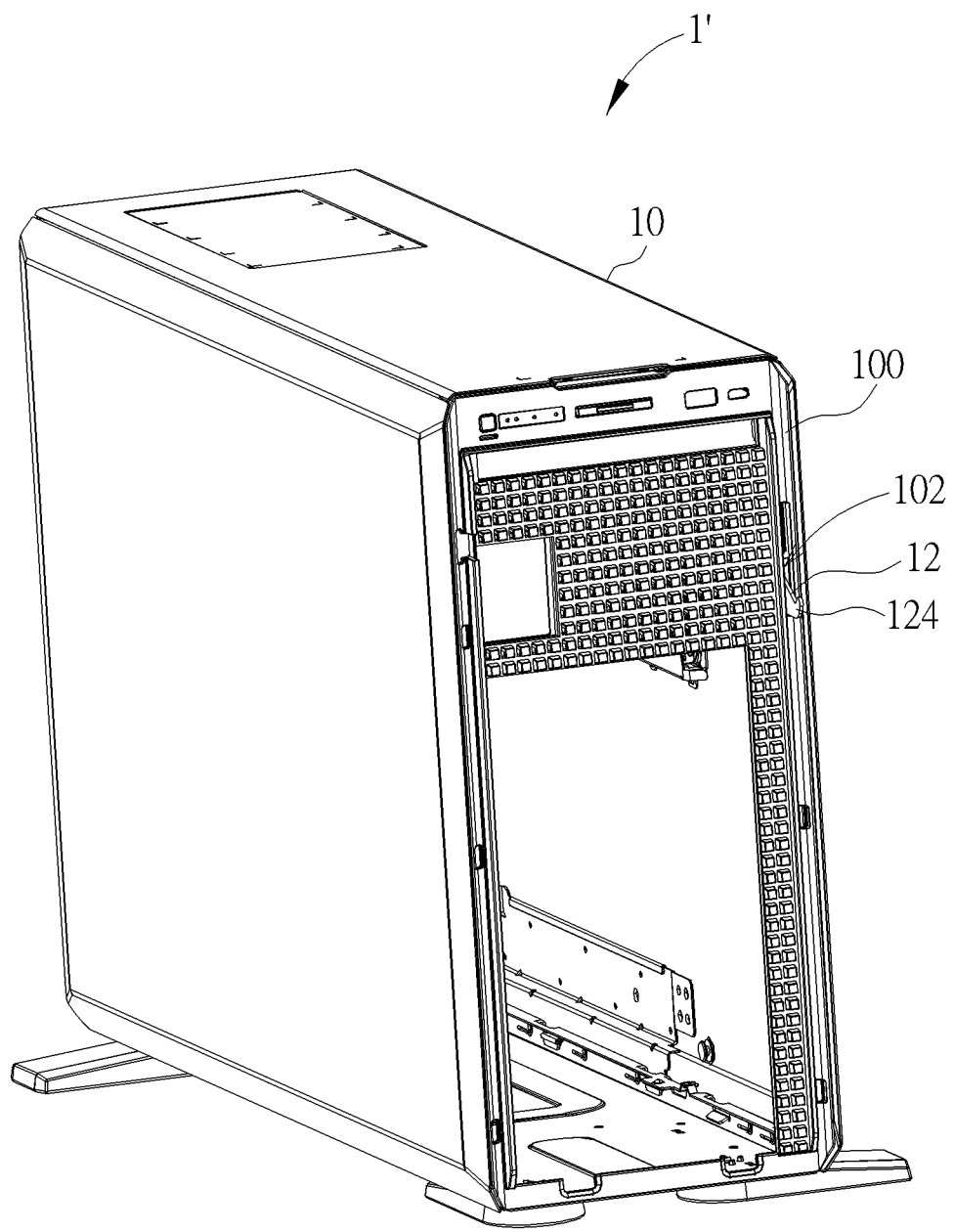
FIG. 6 is a perspective view illustrating a device with lock function according to another embodiment of the invention.
Figure 7:
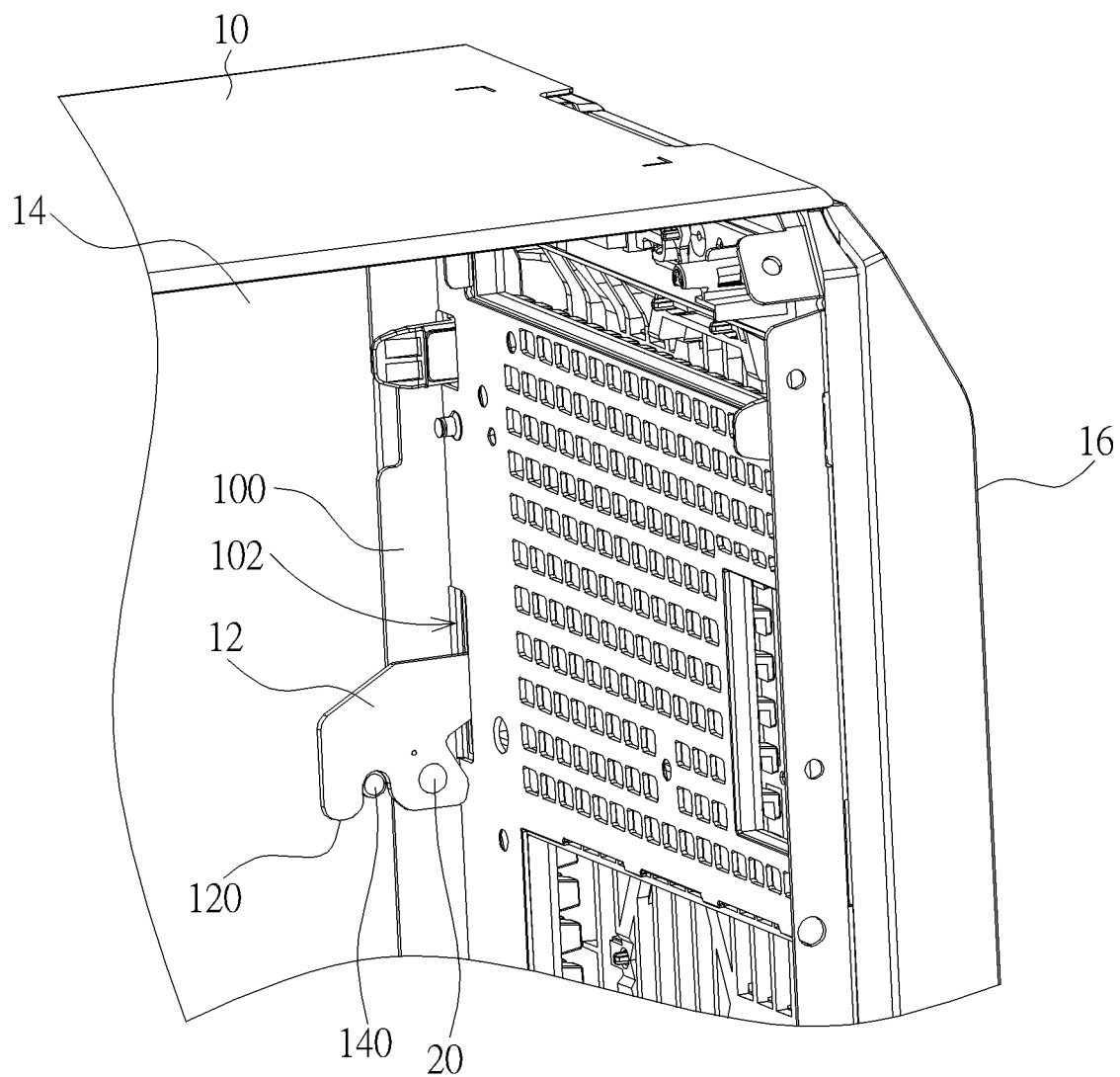
FIG. 7 is a perspective view illustrating the lock member locking the cover.

Referring to FIGS. 6 and 7, FIG. 6 is a perspective view illustrating a device 1' with lock function according to another embodiment of the invention and FIG. 7 is a perspective view illustrating the lock member 12 locking the cover 14.

The main difference between the device 1' and the aforesaid device 1 is that the lock member 12 of the device 1' comprises an extending portion 124, as shown in FIG. 6. In this embodiment, the extending portion 124 of the lock member 12 protrudes from the opening 102 of the bracket 100. Thus, when the shielding member 16 is assembled to the casing 10, the shielding member 16 pushes the extending portion 124 to drive the lock member 12 to rotate, such that the first engaging portion 120 of the lock member 12 engages with the second engaging portion 140 of the cover 14 to lock the cover 14. Since the shielding member 16 directly pushes the extending portion 124 protruding from the opening 102 of the bracket 100, the aforesaid protruding portion 160 may be omitted from the shielding member 16 of the device 1'. It should be noted that the same elements in FIGS. 6-7 and FIGS. 1-5 are represented by the same numerals, so the repeated explanation will not be depicted herein again.

Figure 8:
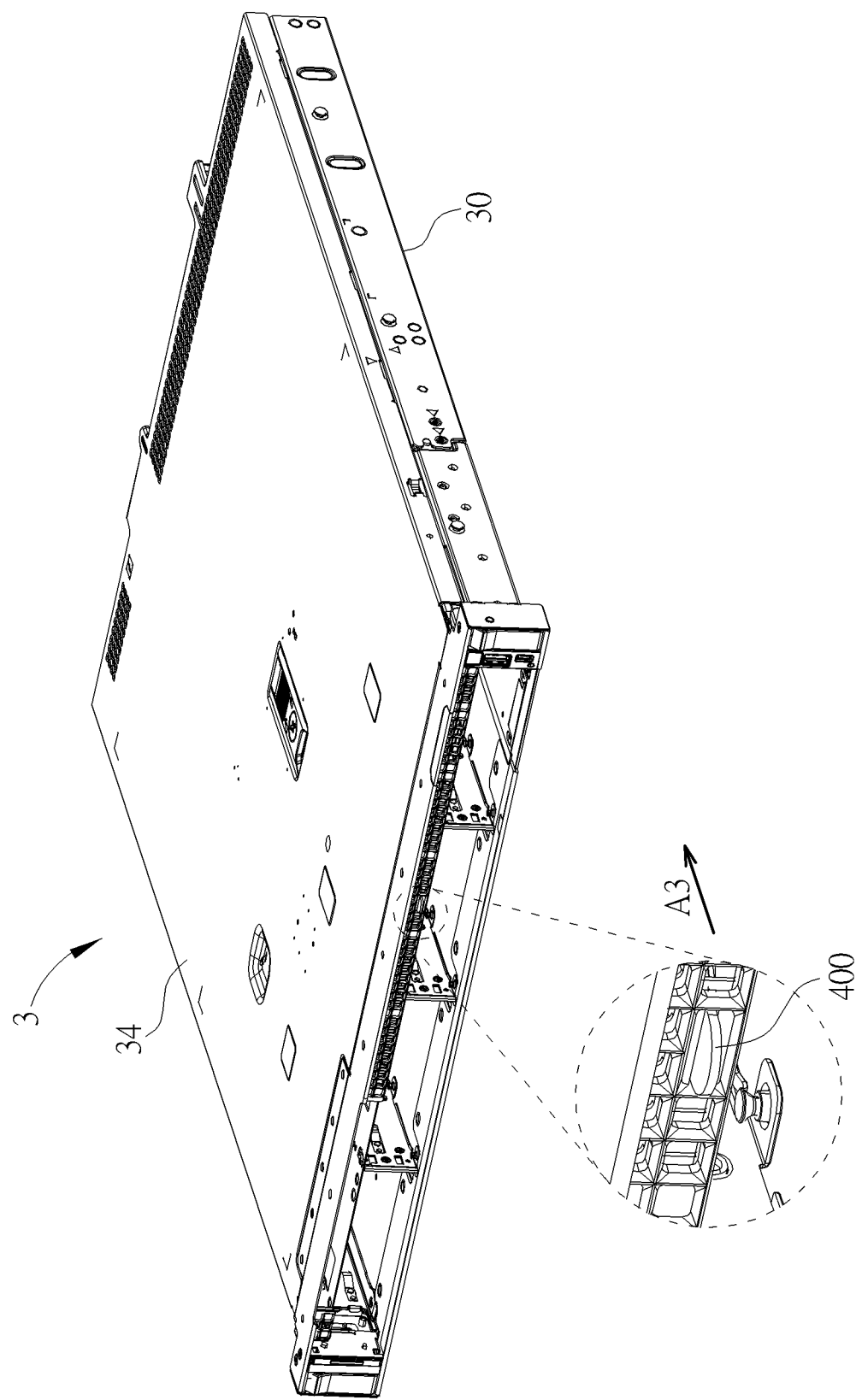
FIG. 8 is a perspective view illustrating a device with lock function according to another embodiment of the invention.
Figure 9:
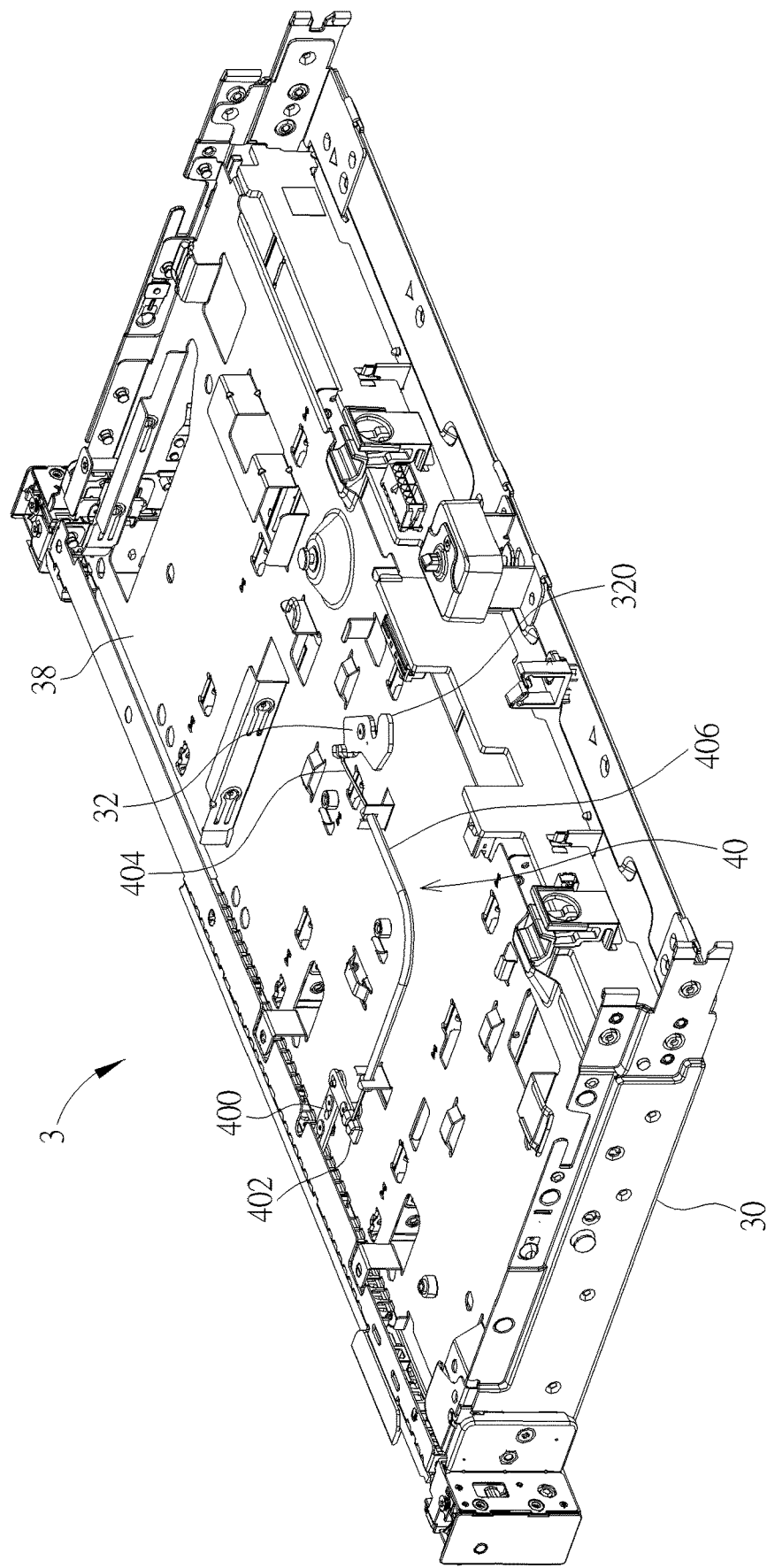
FIG. 9 is a partial inside view illustrating the device shown in FIG. 8.
Figure 10:
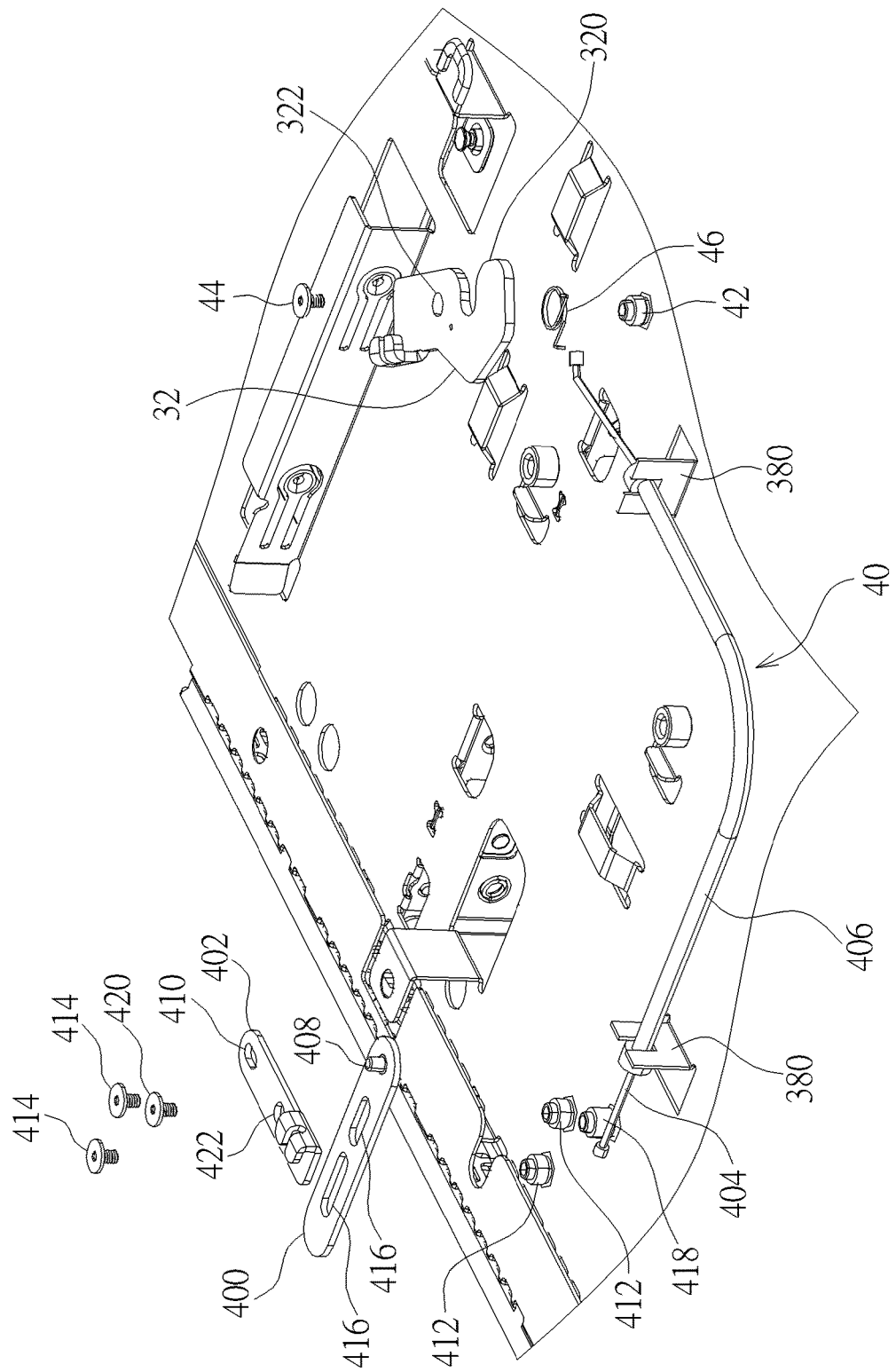
FIG. 10 is a partial exploded view illustrating the device shown in FIG. 9.
Figure 11:
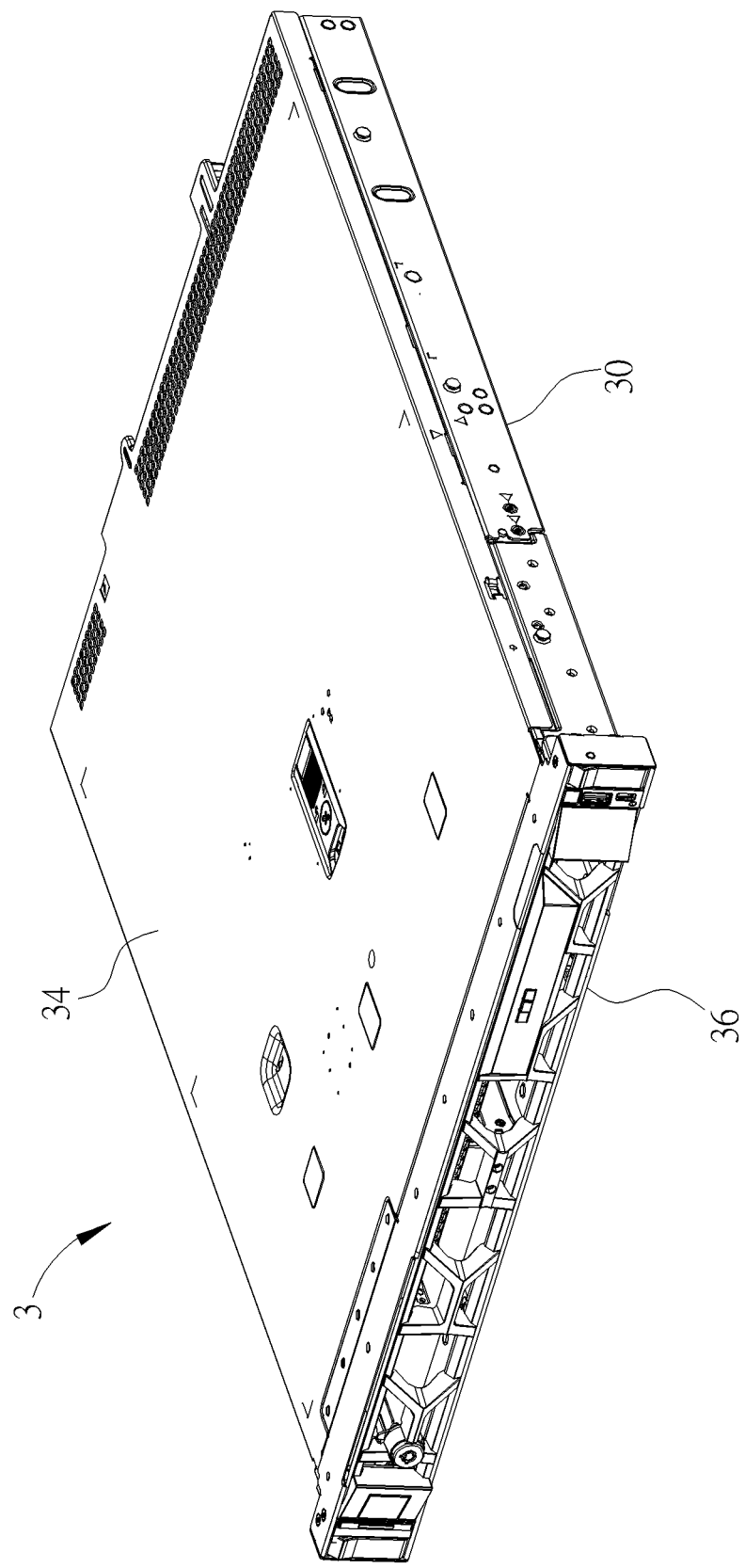
FIG. 11 is a perspective view illustrating a shielding member assembled to a casing shown in FIG. 8.
Figure 12:
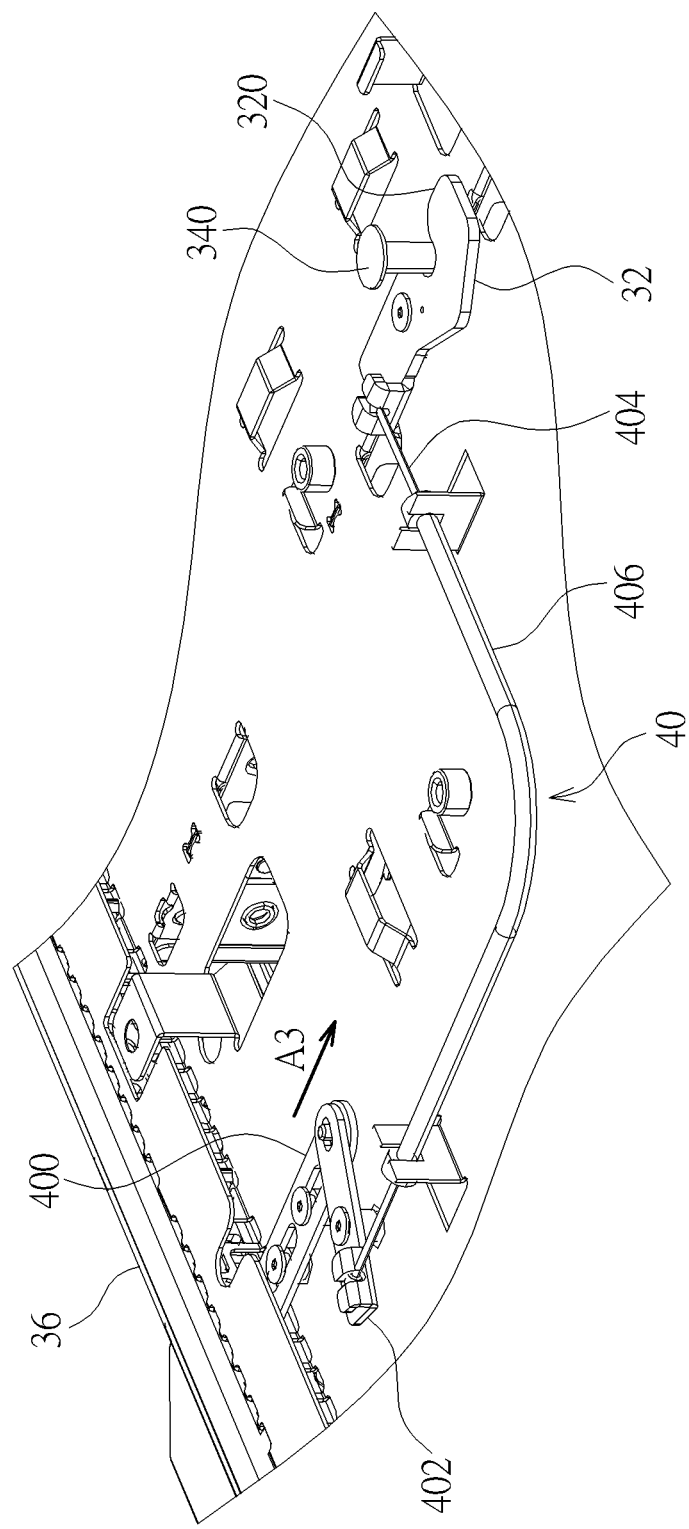
FIG. 12 is a partial inside view illustrating the device shown in FIG. 11.

Referring to FIGS. 8 to 12, FIG. 8 is a perspective view illustrating a device 3 with lock function according to another embodiment of the invention, FIG. 9 is a partial inside view illustrating the device 3 shown in FIG. 8, FIG. 10 is a partial exploded view illustrating the device 3 shown in FIG. 9, FIG. 11 is a perspective view illustrating a shielding member 36 assembled to a casing 30 shown in FIG. 8, and FIG. 12 is a partial inside view illustrating the device 3 shown in FIG. 11.

As shown in FIGS. 8 to 12, the device 3 with lock function comprises a casing 30, a lock member 32, a cover 34, a shielding member 36, a fixing member 38 and a linkage mechanism 40. In this embodiment, the device 3 may be a computer, a server or other devices requiring lock function. It should be noted that the device 3 may be an electronic device or a non-electronic device according to practical applications.

The lock member 32 is rotatably disposed in the casing 30 and the lock member 32 comprises a first engaging portion 320. The fixing member 38 is disposed in the casing 30. In this embodiment, the lock member 32 may be pivotally connected to the fixing member 38 to be rotatably disposed in the casing 30. The fixing member 38 may be a support frame. In this embodiment, the device 3 may further comprise a standoff 42, a screw 44 and a torsion spring 46. As shown in FIG. 10, the standoff 42 may be embedded on the fixing member 38. Furthermore, the lock member 32 may comprise a through hole 322. The screw 44 may pass through the through hole 322 to be fixed to the standoff 42 to pivotally connect the lock member 32 to the fixing member 38. The torsion spring 46 may be sleeved on the standoff 42 and opposite ends of the torsion spring 46 are respectively connected to the lock member 32 and the fixing member 38. Accordingly, after the lock member 32 rotates, the torsion spring 46 is able to drive the lock member 32 to return. It should be noted that the invention may also pivotally connect the lock member 32 to the fixing member 38 by other shaft structures, wherein the composition of the shaft structure may be determined according to practical applications.

The cover 34 is disposed on the casing 30. The cover 34 may be, but is not limited to, a top cover. The cover 34 comprises a second engaging portion 340 (as shown in FIG. 12). It should be noted that the second engaging portion 340 is disposed at an inner side of the cover 34 relative to the casing 30. When the cover 34 is disposed on the casing 30, the second engaging portion 340 is located at a position shown in FIG. 12.

The linkage mechanism 40 is connected to the lock member 32. A user may dispose the cover 34 on the casing 30 first, as shown in FIG. 8. Then, the user assembles the shielding member 36 to the casing 30, as shown in FIG. 11. When the shielding member 36 is assembled to the casing 30, the shielding member 36 pushes the linkage mechanism 40, such that the linkage mechanism 40 drives the lock member 32 to rotate and then the first engaging portion 320 of the lock member 32 engages with the second engaging portion 340 of the cover 34 to lock the cover 34. Accordingly, the invention can lock the cover 34 by assembling the shielding member 36, so as to prevent the cover 34 from being detached. The shielding member 36 may be, but is not limited to, a security shielding plate for protecting a region in front of the device 3.

In this embodiment, the linkage mechanism 40 may comprise a first linkage member 400, a second linkage member 402, a pulling member 404 and a tube 406. The first linkage member 400 is movably disposed on the fixing member 30 and an end of the first linkage member 400 protrudes from the casing 30 (as shown in FIG. 8). The first linkage member 400 may be pushed by the shielding member 36. The second linkage member 402 is pivotally connected to the fixing member 38 and connected to the first linkage member 400. The tube 406 is disposed on the fixing member 38 and the pulling member 404 is disposed in the tube 406. In this embodiment, the tube 406 may be disposed on two support bases 380 bended from the fixing member 38. Opposite ends of the pulling member 404 are respectively connected to the second linkage member 402 and the lock member 32. In this embodiment, the pulling member 404 may be, but is not limited to, a steel rope.

In this embodiment, the linkage mechanism 40 may further comprise a positioning member 408 and the second linkage member 402 may comprise a positioning groove 410. The positioning member 408 is embedded on the first linkage member 400 and the positioning member 408 is disposed in the positioning groove 410 to connect the second linkage member 402 to the first linkage member 400. It should be noted that the invention may also connect the second linkage member 402 to the first linkage member 400 by other positioning structures, wherein the composition of the positioning structure may be determined according to practical applications.

In this embodiment, the linkage mechanism 40 may further comprise two standoffs 412 and two screws 414. The two standoffs 412 are embedded on the fixing member 38. The first linkage member 400 comprises two guiding grooves 416. The two screws 414 pass through the two guiding grooves 416 to be fixed to the two standoffs 412, such that the first linkage member 400 is movably disposed on the fixing member 38. Accordingly, the first linkage member 400 is able to linearly move with respect to the fixing member 38. It should be noted that the invention may also movably dispose the first linkage member 400 on the fixing member 38 by other guiding structures, wherein the composition of the guiding structure may be determined according to practical applications.

In this embodiment, the linkage mechanism 40 may further comprise a standoff 418 and a screw 420, and the second linkage member 402 may comprise a through hole 422. The standoff 418 is embedded on the fixing member 38. The screw 420 passes through the through hole 422 to be fixing to the standoff 418 to pivotally connect the second linkage member 402 to the fixing member 38. It should be noted that the invention may also pivotally connect the second linkage member 402 to the fixing member 38 by other shaft structures, wherein the composition of the shaft structure may be determined according to practical applications.

When the shielding member 36 is assembled to the casing 30, the shielding member 36 pushes the first linkage member 400 in a direction of an arrow A3 shown in FIGS. 8 and 12. Then, the first linkage member 400 drives the second linkage member 402 to rotate and the second linkage member 402 pulls the pulling member 404, such that the pulling member 404 pulls the lock member 32 to rotate. At this time, the first engaging portion 320 of the lock member 32 engages with the second engaging portion 340 of the cover 34 to lock the cover 34, as shown in FIG. 12. When the user wants to detach the cover 34, the user needs to detach the shielding member 36 first. After the shielding member 36 is detached, the torsion spring 46 drives the lock member 32 to return to a position shown in FIG. 9, such that the first engaging portion 320 of the lock member 32 disengages from the second engaging portion 340 of the cover 34. Then, the user can detach the cover 34 from the casing 30.

As mentioned in the above, the invention disposes the rotatable lock member in the casing. A user may dispose the cover on the casing first and then assemble the shielding member to the casing. When the shielding member is assembled to the casing, the shielding member drives the lock member to rotate, such that the first engaging portion of the lock member engages with the second engaging portion of the cover to lock the cover. Accordingly, the invention can lock the cover by assembling the shielding member, so as to prevent the cover from being detached.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A device with lock function comprising:
   a casing comprising a bracket, the bracket comprising an opening;
   a lock member comprising a first engaging portion and a through hole;
   a standoff embedded on the bracket;
   a screw passing through the through hole to be fixed to the standoff to pivotally connect the lock member to the bracket;
   a cover disposed on the casing, the cover comprising a second engaging portion; and
   a shielding member comprising a protruding portion;
   wherein, when the shielding member is assembled to the casing, the protruding portion passes through the opening to push the lock member to engage the first engaging portion with the second engaging portion to lock the cover.

2. The device with lock function of claim 1, further comprising a torsion spring sleeved on the standoff, opposite ends of the torsion spring being respectively connected to the lock member and the bracket.

3. The device with lock function of claim 1, wherein a line between a rotation center of the lock member and an axial center of the second engaging portion is parallel to an assembly direction of the cover relative to the casing.

4. A device with lock function comprising:
   a casing comprising a bracket, the bracket comprising an opening;
   a lock member comprising a first engaging portion and a through hole;
   a standoff embedded on the bracket;
   a screw passing through the through hole to be fixed to the standoff to pivotally connect the lock member to the bracket;
   a cover disposed on the casing, the cover comprising a second engaging portion;
   a shielding member; and
   a protruding portion;
   wherein, when the shielding member is assembled to the casing, the protruding portion passes through the opening to push the lock member to engage the first engaging portion with the second engaging portion to lock the cover.

* * * * *